US012484137B2

(12) United States Patent
Cantzler et al.

(10) Patent No.: US 12,484,137 B2
(45) Date of Patent: Nov. 25, 2025

(54) PLASMA DEVICE ACTIVATION WITHIN A PREDETERMINED DISTANCE (71) Applicant: TERRAPLASMA GMBH, Garching (DE)

(72) Inventors: Maximilian Cantzler, Grafing bei München (DE); Hannes Weilemann, Munich (DE); Sylvia Cantzler, Grafing bei München (DE); Julia Zimmermann, Munich (DE)

(73) Assignee: TERRAPLASMA GMBH, Garching (DE)

( * ) Notice: Subject to any disclaimer, the term of this patent is extended or adjusted under 35 U.S.C. 154(b) by 883 days.

(21) Appl. No.: 17/754,354

(22) PCT Filed: Nov. 19, 2020

(86) PCT No.: PCT/EP2020/082620
§ 371 (c)(1),
(2) Date: Mar. 30, 2022

(87) PCT Pub. No.: WO2021/099436
PCT Pub. Date: May 27, 2021

(65) Prior Publication Data
US 2022/0394841 A1 Dec. 8, 2022

(30) Foreign Application Priority Data
Nov. 19, 2019 (EP) ..................................... 19210075

(51) Int. Cl.
*H05H 1/24* (2006.01)
*D06M 10/02* (2006.01)
(52) U.S. Cl.
CPC ........ *H05H 1/2406* (2013.01); *D06M 10/025* (2013.01); *H05H 1/2439* (2021.05);
(Continued)

(58) Field of Classification Search
CPC ............... H05H 1/2406; H05H 1/2439; H05H 2245/36; H05H 2245/40; H05H 2245/60; D06M 10/025
See application file for complete search history.

(56) References Cited

U.S. PATENT DOCUMENTS 9,889,218 B2   2/2018   Morfill et al.
10,300,159 B2  5/2019   Morfill et al.
(Continued)

FOREIGN PATENT DOCUMENTS

EP      3075896 A1    10/2016
KR    101407672 B1     6/2014
(Continued)

OTHER PUBLICATIONS

International Search Report and Written Opinion for corresponding International Application No. PCT/EP2020/082620 dated Feb. 11, 2021.
(Continued)

*Primary Examiner* — John P. Dulka
(74) *Attorney, Agent, or Firm* — Westman, Champlin & Koehler, P.A.

(57) ABSTRACT

Provided is a plasma device for applying a cold atmospheric plasma to a surface to be treated, in particular on textiles, leather and/or plastic fibers. The plasma device includes a housing, a plasma source in the housing, and a voltage source in the housing for applying a voltage to the plasma source, wherein the plasma device is configured to enable activation of the plasma source and/or to selectively switch the plasma source on only if a distance between the plasma source and the surface to be treated is within a predetermined distance.

22 Claims, 7 Drawing Sheets (52) U.S. Cl.
    CPC ..... *H05H 2245/36* (2021.05); *H05H 2245/40* (2021.05); *H05H 2245/60* (2021.05)

(56) References Cited

U.S. PATENT DOCUMENTS

| | | | |
|---|---|---|---|
| 2012/0039747 A1* | 2/2012 | Morfill | A61L 2/14 422/186.05 |
| 2014/0147333 A1 | 5/2014 | Morfill et al. | |
| 2019/0083161 A1 | 3/2019 | Harle et al. | |
| 2019/0104605 A1* | 4/2019 | Van Abeelen | A61B 18/042 |
| 2020/0137866 A1* | 4/2020 | Nettesheim | H10N 30/20 |

FOREIGN PATENT DOCUMENTS

| | | | | |
|---|---|---|---|---|
| WO | 2012150041 A1 | 11/2012 | | |
| WO | WO-2017162614 A1 * | 9/2017 | ........... | A61B 18/042 |
| WO | 2017179819 A1 | 10/2017 | | |
| WO | WO-2018167159 A1 * | 9/2018 | ........... | H01L 41/044 |

OTHER PUBLICATIONS

Search Report for corresponding European Application No. 19210075.8 dated May 25, 2020.
U.S. Department of Health and Human Services and U.S. Department of Labor, "Nail Gun Safety: A Guide for Construction Contractors", DHHS (NIOSH) Publication No. 2011-202 | OSHA Publication No. 3459-8-11 (2011), 20 pages.

\* cited by examiner

| type of fabric | moist fabric after CAP treatment | dry fabric after CAP treatment | result |
|---|---|---|---|
| artificial leather | | | • no change in color<br>• material not harmed |
| brocade | | | • no change in color<br>• material not harmed |
| cotton (elastic) | | | • no change in color<br>• material not harmed |
| fleece | | | • no change in color<br>• material not harmed |
| polyacrylic | | | • no change in color<br>• material not harmed |
| synthetic jersey w. velvet applications | | | • no change in color<br>• material not harmed |

Fig. 3A

| type of fabric | moist fabric after CAP treatment | dry fabric after CAP treatment | result |
|---|---|---|---|
| cotton (rigid) | | | • no change in color<br>• wet material shows burns |
| linen | | | • no change in color<br>• wet material shows significant burns |
| polyester | | | • no change in color<br>• wet material shows burns |
| satin | | | • no change in color<br>• wet material shows burns |
| Silk (thinly woven) | | | • no change in color<br>• wet material shows burns |
| jersey w. weaving pattern (delicate) | | | • no change in color<br>• wet texture is harmed – some fibers are ripped out |
| velvet | | | • no change in color<br>• material is burned and slightly scratched |

PLASMA DEVICE ACTIVATION WITHIN A PREDETERMINED DISTANCE

CROSS-REFERENCE TO RELATED APPLICATION

This Application is a Section 371 National Stage Application of International Application No. PCT/EP2020/082620, filed Nov. 19, 2020 and published as WO 2021/099436 A1 on May 27, 2021, in English, and further claims priority to European Application No. 19210075.8 filed Nov. 19, 2019.

The present invention relates to plasma devices, and more specifically to plasma devices for applying cold atmospheric plasma to a surface to be treated, in particular textiles, leather and/or fibers, and even more specifically to safe use of such plasma devices.

It is known that plasmas can be used for disinfection, especially of surfaces contaminated with bacteria. Typical uses of such devices are found in the fields of disinfection or sterilization, surface functionalization, as well as the medical field, such as wound disinfection, wound treatment, and healing and treating skin irritations, as well as treating bacterial, viral and fungal skin diseases. The known plasma devices meanwhile are not restricted to application to surfaces. Air volumes can also be disinfected in this way.

Bacteria are often responsible for formation of unpleasant odor on surfaces or in air volumes, metabolizing nutritious substances that are present and then producing substances with unpleasant odor. Killing or deactivating these bacteria can at least temporarily prevent additional substances with unpleasant odors or other interfering molecules, i.e. molecules which are non-odor-relevant but cause discomfort, sick feeling, disease, weakness or similar conditions, such as allergens, protein molecules or prions, from being formed. The substances which are already present are, however, not eliminated so that their odor ordinarily can only be masked or covered by additional volatile substances (fragrances). It is desirable, therefore, to deactivate the malodorous substances. It is also desired to deactivate interfering molecules.

A similar application is to refresh textiles and/or clothes instead of or in addition to washing them.

It is known to refresh textiles and/or clothes by different methods. One possibility is to mask malodor by a suitable, better odor or perfume, but this does not remove the odorous molecules or the source of the malodor. Another option is to remove the source of malodor (e.g. bacteria). This, however, does not remove the existing odorous molecules, but only stops the addition of new malodor provided that all bacteria are permanently inactivated. Due to the fact that bacteria double their numbers in preferred zones such as an armpit in typically 5 minutes, a 3-log reduction to a thousandth ($1/1000$) is replenished after only 1 hour, so that an antibacterial method has to be repeated frequently. A further option is to destroy malodorous molecules by chemical reaction. In particular, ozone may be used, but due to its toxicity it has to be filtered out again from the air after the chemical oxidation of malodorous molecules has been conducted. In addition, the reaction is slow and requires long interaction times, as ozone molecules move thermally at only roughly 200 meters per second. It is also possible to remove malodorous molecules and sources by washing the textiles and/or clothes. This is a standard process, partly mechanical and partly chemical. It works well in many circumstances, but it takes time, is costly, has a high carbon footprint and is an effort requiring access to a washing machine, which is not always possible (e.g. on travel). Another problem is that not all textiles or clothes can be washed, because they will be deteriorated or even destroyed during the washing process. Furthermore, washing below 40° C. does not remove malodor sources (i.e. bacteria) and may even enhance their growth. Malodor may similarly also be removed by dry cleaning. Basically the same principle as for washing applies, while dry cleaning agents, in particular chemical agents, may affect some textiles and/or clothes negatively.

In addition to the foregoing methods, cold atmospheric plasma devices can also be used for removing malodor. Conventionally, plasma devices can only be operated efficiently at relatively high voltage amplitudes, and for reasons of electrical safety there are restrictions for operating such devices close to the skin of a human being. Moreover, conventional devices are comparatively large and rigid.

Even further, plasma devices may generate a number of chemical species. These may comprise, for example, electrons, ions, reactive species, in particular reactive oxygen such as $O_3$ and nitrogen species such as NO, $NO_2$, etc., neutrals and UV light, some of which could cause harm to humans if exceeding certain thresholds. The local increase of temperature at the interface of a plasma device and a surface to be treated may also damage the material being treated.

Accordingly, the application of cold plasma for refreshing clothes must be both comfortable and safe. Both the treated fabrics and the user should be protected against foreseeable problems, including misuse. An underlying task of the invention is, therefore, to provide plasma devices that are safe in use, i.e., to ensure that they are safe for a user of the plasma devices and that applications of the plasma devices on different materials are safe for the treated materials.

Accordingly, a first aspect of the present invention is directed to a plasma device for applying cold atmospheric plasma to a surface to be treated. The surface to be treated may, in particular, be a textile, leather and/or plastic fibers. The plasma device includes a housing and in the housing a plasma source and a voltage source for applying a voltage to the plasma source. The plasma device is configured to enable activation of the plasma source (e.g., activation by a user, for example via an input from the user) only if a distance between the plasma source and the surface to be treated is within a predetermined distance. The plasma device may be configured to selectively switch the plasma source on only if a distance between the plasma source and the surface to be treated is within a predetermined distance. That is, the plasma can be ignited only when the device comes within proximity of, or into contact with, the surface to be treated. This is believed to be helpful for preventing emissions if the plasma device is not used for the intended purpose.

Preferably, the predetermined distance is in a range of 0 to 4 mm, and more preferably 0 to 1 mm.

As described herein, the term "cold atmospheric plasma" (CAP) refers to plasmas operating under normal atmospheric conditions (e.g. temperature and pressure) and, for example, allowing painless in vivo applications without damaging tissue. Cold atmospheric plasmas can be produced by, for example, limiting a number of high-energetic electrons and/or by cooling uncharged molecules/atoms in the plasma. An important feature of cold atmospheric plasma is that it still maintains bactericidal and fungicidal properties.

As described herein, the plasma source may be in any form that is capable of producing the cold atmospheric plasma and applying the same to a surface to be treated. Preferably, a surface micro discharge (SMD) device is used. Further optional structural features will be discussed below.

Preferably, the plasma device includes a distance sensor for measuring the distance between the plasma source and the surface to be treated. Preferably, the distance sensor is a mechanical distance sensor. For example, the plasma device can be configured to have a mechanical distance sensor in a way that the plasma device includes a voltage source connector electrically connected to the voltage source and a plasma source connector electrically connected to the plasma source, wherein the voltage source connector and the plasma source connector are spaced apart from, and movable with respect to, each other and the plasma device is configured such that the voltage source connector and the plasma source connector move toward and electrically couple with each other when the housing and/or the plasma source and the surface to be treated are pressed against each other. In this way, the plasma device is activated only and/or switched on only if the housing or the plasma source contacts with the surface to be treated, thereby preventing emissions if the plasma device is not used for the intended purpose.

Alternatively or additionally, the plasma device may include a light sensor. The plasma device is preferably configured to enable activation of the plasma source (e.g., activation by a user, for example via an input from the user) only when an amount of light received by the light sensor is below a predetermined value. Preferably, the light sensor is configured such that the predetermined value of the amount of light corresponds to the aforementioned predetermined distance between the plasma source and the surface to be treated. That is, when the plasma device is brought close to an object to be treated, light received by the light sensor will be gradually blocked by the object. The amount of light received by the light sensor when the plasma device is kept at the predetermined distance could, therefore, be chosen as the predetermined value. Alternatively, the plasma device may comprise a light source and the light reflected by the object may be measured. In this case the plasma device may be configured to enable activation of the plasma source (e.g., activation by a user, for example via an input from the user) only when an amount of light received by the light sensor is above a predetermined value.

Preferably, the plasma device is configured to switch the plasma source off automatically after the plasma source has been switched on for a predetermined period of time. Preferably, the plasma device includes a timer for realizing the automatic switching-off. Preferably, the predetermined period of time is determined taking into consideration the threshold concentration of toxic species generated by the plasma device. In this way, the risk that users of the plasma device may be exposed to an overdose of toxic substances may be reduced.

Preferably, the plasma device is further configured to enable activation of the plasma source (e.g., activation by a user, for example via an input from the user) again after the plasma source has been switched off for a predetermined waiting period, which allows the concentration of the toxic substances to fall well below the threshold.

Following similar considerations, the plasma device preferably may further include a display or control light configured to instruct a user to ventilate a surrounding area of the plasma device after the plasma source has been switched on for a predetermined period of time.

Preferably, the plasma device further includes a speed sensor for measuring a speed with which the plasma device is moved over the surface to be treated. Preferably, the plasma device is configured to switch the plasma source off automatically when the speed detected is below a first predetermined speed value and/or above a second predetermined speed value. In this way, the plasma device is ensured to operate in a proper speed range, i.e., not too slowly (to keep the temperature at the interface between the plasma device and the surface to be treated below the operating threshold, i.e., below the temperature that may damage the specific material being treated) and not too fast (to fulfill the purpose of the treatment, e.g., to allow the malodorous molecules to be deactivated).

Following similar considerations, the plasma device further includes a display or control light configured to carry out at least one of the following: provide an indication on whether the speed with which the plasma device moves along the surface to be treated falls within a predetermined range, provide an indication on whether the speed is below the first predetermined speed value, and provide an indication on whether the speed is above the second predetermined speed value.

Preferably, the plasma device further includes a surface property detection device for detecting at least one property of the surface to be treated. The at least one property may be, for example, a moisture level, a temperature, etc. That is, the surface property detection device preferably includes a moisture sensor for detecting the moisture level of the surface to be treated, in which case the plasma device is preferably configured to switch the plasma source off automatically if the moisture level of the surface to be treated is higher than a predetermined moisture value, thereby preventing the plasma device from being operated with excessively high power. The moisture level of the surface to be treated may be detected by measuring a power consumed by the plasma source. Preferably, the power consumed by the plasma source is recorded at a frequency of at least $10\ s^{-1}$, preferably $50\ s^{-1}$, and more preferably $100\ s^{-1}$. Such measurement may be performed, for example, in control circuitry of the plasma device. As such, the plasma source and control circuitry may form the moisture sensor. However, also a separate sensor may be employed.

Alternatively or additionally, the surface property detection device includes a temperature sensor for detecting the temperature of the surface to be treated, in which case the plasma device is configured to switch the plasma source off automatically if the temperature of the surface to be treated is higher than a predetermined temperature value, thereby preventing the treated material from being damaged.

Preferably, the plasma device includes control circuitry configured to adjust the plasma depending on the detected surface property, in particular depending on the detected moisture level and/or temperature, so that the refreshing treatment is carried out without damaging the treated material.

As mentioned above, there is no particular limitation regarding the structural arrangement of the plasma source of the device of the present invention. Preferably, the plasma source includes a first electrode, a second electrode and a dielectric layer separating the first electrode and the second electrode, wherein the first electrode is configured to ignite the cold atmospheric plasma for treating the surface to be treated. That is, the first electrode is arranged to be closer to the surface to be treated than the second electrode. The first electrode is preferably configured to contact the surface to be treated. The first electrode may further be covered by a dielectric material. Preferably, the first electrode or the dielectric material covering the first electrode is exposed to the surrounding atmosphere through an opening of the housing while the second electrode is arranged inside the housing. It is noted that such an electrode structure also forms an independent aspect of the present invention and may be provided independently of the above-mentioned first aspect. It may, however, also be combined with any of the above-mentioned sensors.

To further enhance the safety of the plasma device, in particular against misuse, preferably, the first electrode is grounded and/or the plasma device further includes an on/off switch electrically connected to the first electrode, wherein the plasma device is configured to enable activation of the plasma source only and/or to selectively switch the plasma source on only if the on/off switch is pressed. Accordingly, throughout the use of the plasma device, there is no potential difference between the user and the first electrode, and thus there will be no discharge from the first electrode, i.e., the electrode at which the plasma is ignited, to the user.

In other words, a conducting connection between the first electrode and the skin of the user may be established, for example through a conducting switch and/or through another conductive portion of the housing of the device. Preferably, the device is designed such that the conducting switch and/or the conductive housing portion must be held and/or pressed by the user for the device to operate (e.g., held and/or pressed continuously during operation of the device). In other words, when the conducting switch and/or the conductive housing portion is not being pressed and/or held by the user, respectively, the control circuitry of the device may disable an activation of the plasma source. The switch may be the on/off switch of the device. However, also an additional security switch may be used, which may be required to be pressed in addition to the on/off switch.

As the skilled person will appreciate, such switch (e.g., the on/off switch) may be provided as a mechanical interrupter, but could also be formed as any other type of touch sensor (for example a resistive or capacitive touch sensor).

Also, for example in cases where the first electrode is the electrode coming into contact with the surface to be treated, preferably, the plasma device further includes a temperature sensor configured to detect a temperature of the first electrode. Preferably, the plasma device is configured to selectively switch the plasma source off automatically when the temperature of the first electrode is higher than a predetermined temperature value. This reduces the risk of treated material and/or tissue being damaged by an over-heated electrode.

In order to treat larger areas, the plasma device preferably includes segmented plasma sources, wherein each segment may be provided with any of the foregoing safety architecture, e.g., the distance sensor, the light sensor, the speed sensor, the display or the control light, the surface property detection device, etc.

Preferably, the plasma source includes at least one first plasma source segment and at least one second plasma source segment, wherein the plasma device is configured to selectively switch the first plasma source segment on only if a distance between the first plasma source segment and the surface to be treated is within the predetermined distance and to selectively switch the second plasma source segment on only if a distance between the second plasma source segment and the surface to be treated is within the predetermined distance. The predetermined distance herein is preferably in a range of 0 to 4 mm, and more preferably 0 to 1 mm. This has the particular advantage that a single plasma source segment can be activated and/or deactivated depending on the pre-defined parameter (e.g. distance). Without wanting to be bound by theory, it is believed that this allows to further reduce emissions and to increase the overall efficiency of the device.

Preferably, one of the first electrode and the second electrode includes a first electrode segment in a region of the first plasma source segment and a second electrode segment in a region of the second plasma source segment. That is, one of the first electrode and the second electrode may be a segmented electrode. Preferably, the other one of the first electrode and the second electrode is a common electrode associated with the first and second electrode segments. However, also a segmented second electrode may be used.

Preferably, the first plasma source segment and the second plasma source segment are electrically connected in parallel.

Preferably, in the case where the first electrode is configured to ignite the cold atmospheric plasma for treating the surface to be treated, the first electrode forms the common electrode.

Preferably, the plasma device includes a dielectric layer separating the first electrode segment and the second electrode segment from each other and/or from the common electrode.

Further modifications to the aforementioned plasma devices are also contemplated. For example, the plasma device is preferably constructed as a portable or handheld device. Preferably, the plasma device is designed to have a replaceable plasma source. For example, the plasma device may be constructed such that the plasma source is accommodated in a plasma source unit of the plasma device and the voltage source is accommodated in a main housing of the plasma device, and the plasma source unit is removably coupled to the main housing. In this way, a plasma device may include, for example, the main housing and a number of plasma source units, each of which is particularly suitable for a specific material to be treated.

Another aspect of the present invention is directed to a plasma device for applying a cold atmospheric plasma to a surface to be treated, the plasma device comprising a plasma source, a voltage source for applying a voltage to the plasma source, and a speed sensor configured to measure a speed with which the plasma device is moved over the surface to be treated. The plasma device is configured to perform at least one of the following: selectively switch the plasma source off when the speed detected is below a first predetermined speed value and/or selectively switch the plasma source off when the speed detected is above a second predetermined speed value. Preferably, an indication to the user is provided, in particular via a display or control light, when the speed detected is below the first predetermined speed value; and/or an indication to the user is provided, in particular via a display or control light, when the speed detected is above the second predetermined speed value. In this way, the likelihood that the plasma device operates in a proper speed range may be increased. The aspect may be combined with any of the further features described above for the first aspect.

Yet another aspect of the present invention is directed to a plasma device for applying a cold atmospheric plasma to a surface to be treated, the plasma device comprising a plasma source, a voltage source for applying a voltage to the plasma source, and control circuitry, wherein the plasma source provides a first plasma source segment and a second plasma source segment that are independently activated by the control circuitry. The plasma source includes a first electrode, a second electrode and a dielectric layer separating the first electrode and the second electrode. The first electrode is configured to ignite the cold atmospheric plasma for treating the surface to be treated. One of the first electrode and the second electrode comprises a first electrode segment in a region of the first plasma source segment and a second electrode segment in a region of the second plasma source segment. Preferably, the other one of the first electrode and the second electrode is a common electrode associated with the first and second electrode segments. The plasma device may further include a dielectric layer separating the first electrode segment and the second electrode segment from each other and/or from the common electrode. This is advantageous in that a single plasma source segment can be activated and/or deactivated depending on the predefined parameter (e.g. distance). As a result, emissions can be reduced and the overall efficiency of the device can be increased. The aspect may be combined with any of the further features described above for the first aspect.

A further aspect of the present invention is directed to use of any of the aforementioned plasma devices as a moisture sensor, wherein the plasma device is configured to measure a power consumed by the plasma source, preferably at a frequency of at least $10\ s^{-1}$, more preferably $50\ s^{-1}$, and even more preferably $100\ s^{-1}$.

Hereinafter, the invention will be described in more detail with reference to the preferred embodiments shown in the drawings. However, the scope of the invention for which protection is sought should not be limited to any particulars shown or described below, but rather defined by the appended claims. In the drawings.

Figure 1:
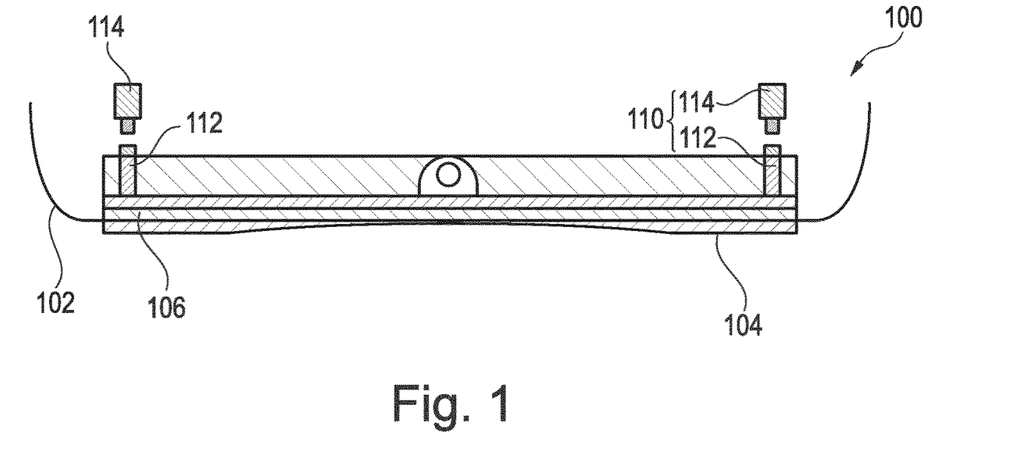
FIG. 1 shows a schematic diagram of a plasma device according to a preferred embodiment of the present invention.

Referring to FIG. 1, a plasma device 100 for applying a cold atmospheric plasma to a surface to be treated (not shown) according to a preferred embodiment of the present invention includes a housing 102, a plasma source 104 in the housing 102, and a voltage source (not shown) in the housing 102 for applying a voltage to the plasma source 104. The plasma source 104 may be held by a plasma source holder 106 which constitutes a front part of the housing 102, as shown in FIG. 1. The plasma device 100 is configured to enable activation of the plasma source 104 only if a distance between the plasma source 104 and the surface to be treated is within a predetermined distance. The selective switching-on may be realized, for example, by a distance sensor 110 as shown in FIG. 1.

In particular, the distance sensor 110 is a mechanical distance sensor including a voltage source connector 114 electrically connected to the voltage source and a plasma source connector 112 electrically connected to the plasma source 104. The voltage source connector 114 and the plasma source connector 112 are configured to be spaced apart from each other when the plasma device 100 does not contact with the surface to be treated. Meanwhile, the voltage source connector 114 and the plasma source connector 112 are configured to be movable with respect to each other. Accordingly, when the plasma device 100 is brought into contact with the surface to be treated, the housing 102 (the plasma source holder 106) and/or the plasma source 104 will be pressed against the surface to be treated, pushing the plasma source connector 112 to move inwardly toward the voltage source connector 114, and eventually, the voltage source connector 114 electrically couples with the plasma source 112, thereby allowing the voltage source to apply a voltage to, i.e., to selectively switch on, the plasma source 112. However, as will be appreciated by the skilled person, the connectors 112, 114 do not necessarily have to be connected to the plasma source and the voltage source, respectively. For example, they may also be coupled to a controller (not shown) which identifies whether a connection is provided.

Figure 2:
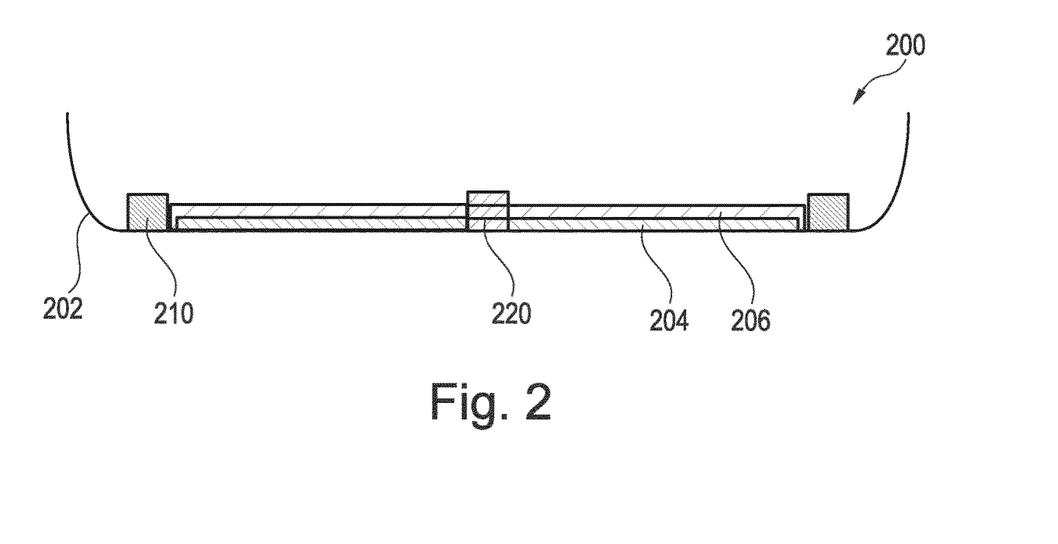
FIG. 2 shows a schematic diagram of a plasma device according to a preferred embodiment of the present invention.

The switching mechanism may, of course, be realized in different manners. Referring to FIG. 2, for example, a plasma device 200 according to another preferred embodiment of the present invention includes a housing 202, a plasma source 204, a plasma source holder 206, and a voltage source (now shown) which are similar to the corresponding elements in the embodiment shown in FIG. 1. However, instead of the distance sensor 110, the plasma device 200 includes a light sensor 210. As the plasma device 200 is brought close to an object to be treated, light is gradually blocked by said object and the amount of light received by the light sensor 210 decreases. The plasma device 200 is configured to selectively switch the plasma source 204 on when the amount of light received by the light sensor 210 is below a predetermined value or to allow switching-on (e.g. by the user) only in this case. Here, the predetermined value may be determined by the amount of light received by the light sensor 210 when the plasma device 200 is kept at the predetermined distance (e.g. 4 mm, 3 mm, 2 mm or 1 mm) to the surface to be treated.

It should be noted that the position of the light sensor is not particularly limited. While the light sensor 210 has been shown in FIG. 2 as being disposed on both ends of the plasma source 204, additional or alternative light sensor(s) may be disposed, for example, at the middle of the plasma source 204, as illustratively shown by the light sensor 220.

Figure 3A:
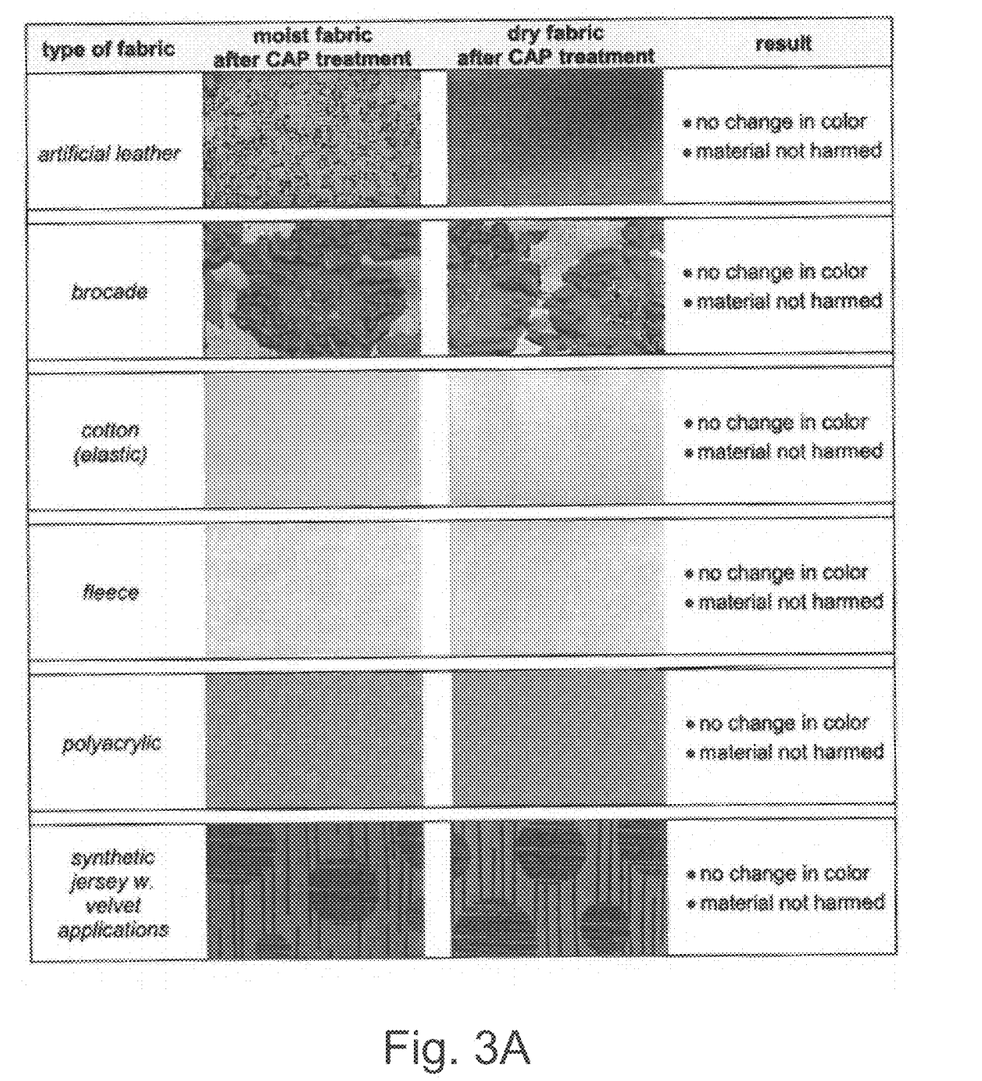
FIG. 3A presents various wet/damp textiles that showed no damage upon cold atmospheric plasma treatment, dry fabric after the same treatment being shown as well for comparison.
Figure 3B:
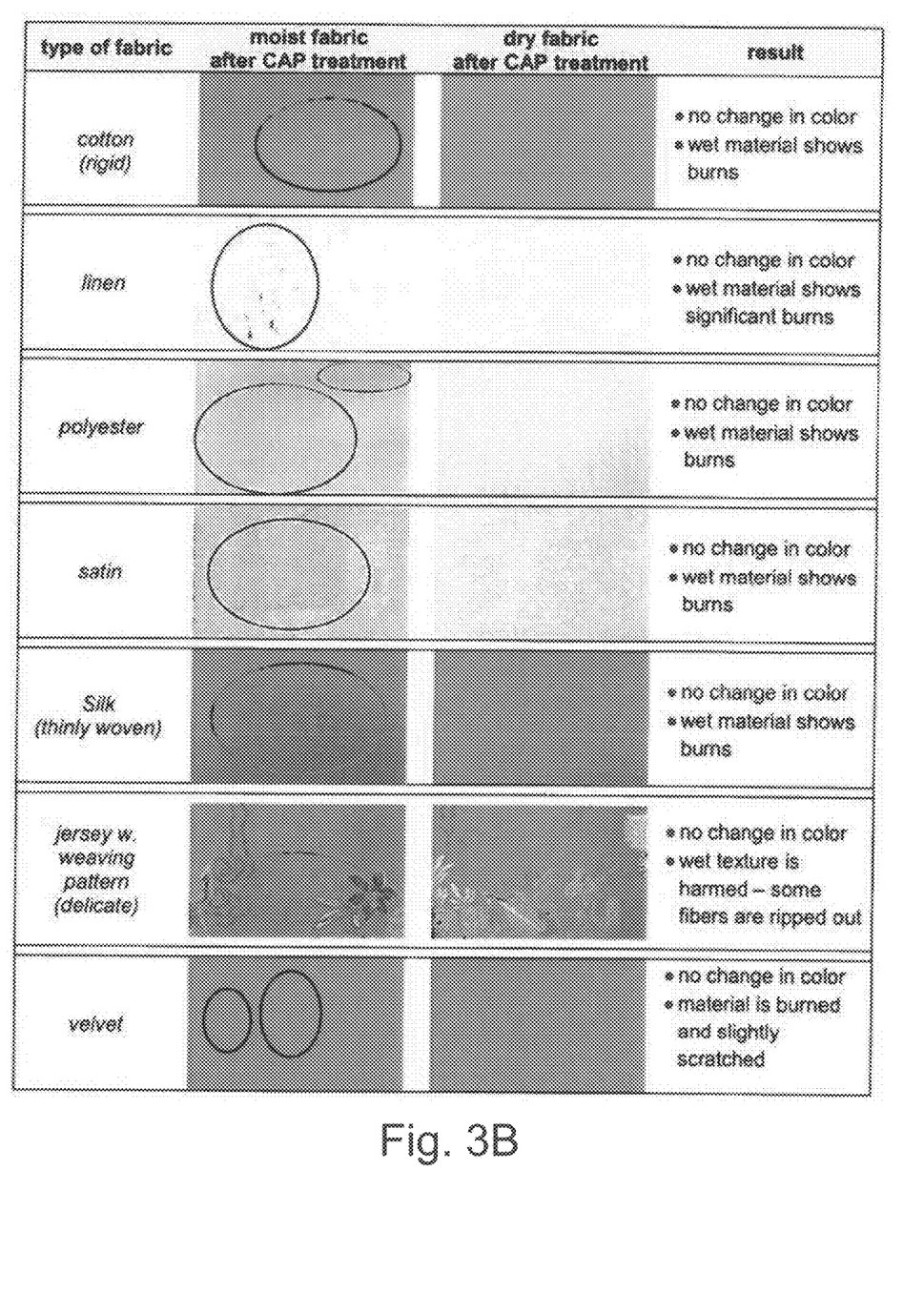
FIG. 3B presents various wet/damp textiles that did show certain damage upon cold atmospheric plasma treatment, dry fabric after the same treatment being shown as well for comparison.

In order to explore further aspects regarding using the plasma device safely on refreshing textiles/clothes, in particular regarding safety for the treated materials, the inventors conducted a series of cold atmospheric plasma treatments on various fabrics in their wet and dry conditions, the results being summarized in FIGS. 3A and 3B.

It can be seen from FIGS. 3A and 3B that the treatment using the plasma device was applicable for all tested fabrics—dry or damp. The plasma device could be moved smoothly over all investigated fabrics—no catching or snagging was observed. No color changes or other damage was observed for all dry fabrics investigated within this study. This result is independent of the number of swipes tested.

However, upon treatment of wet/damp fabrics, some fabric samples showed damage, as marked in FIG. 3B in the respective sections of the photographs.

Without wanting to be bound by theory, it is deduced from optical investigations that burning of damp fabrics occurs on slightly dryer parts of the fabric where the plasma discharge gets concentrated and the local temperature increased.

Figure 4A:
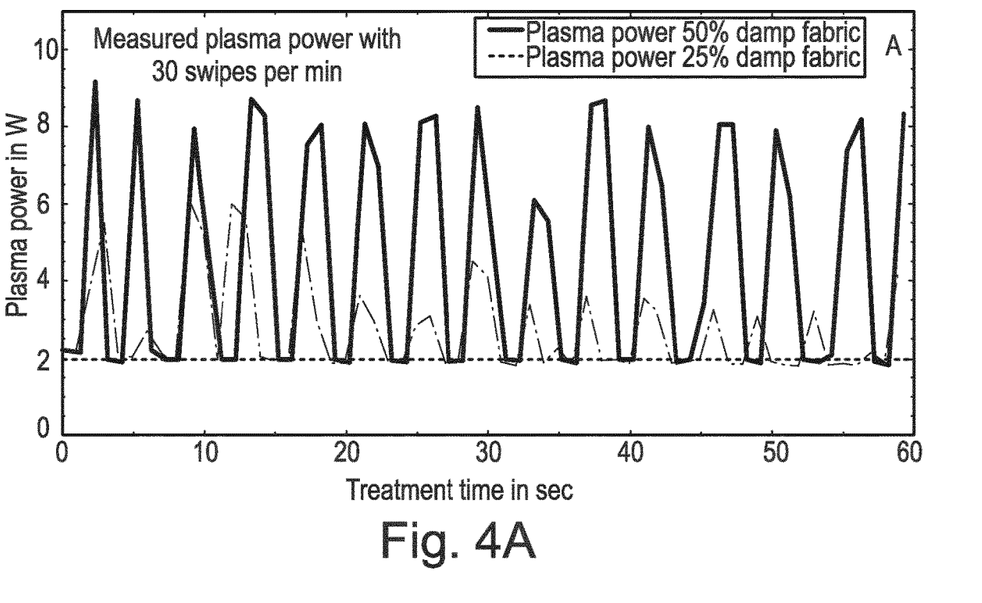
FIGS. 4A and 4B, respectively, show the plasma power consumed by a plasma source of a plasma device according to the present invention when the plasma device was swiped over sample fabrics with conditions described in detail below.
Figure 4B:
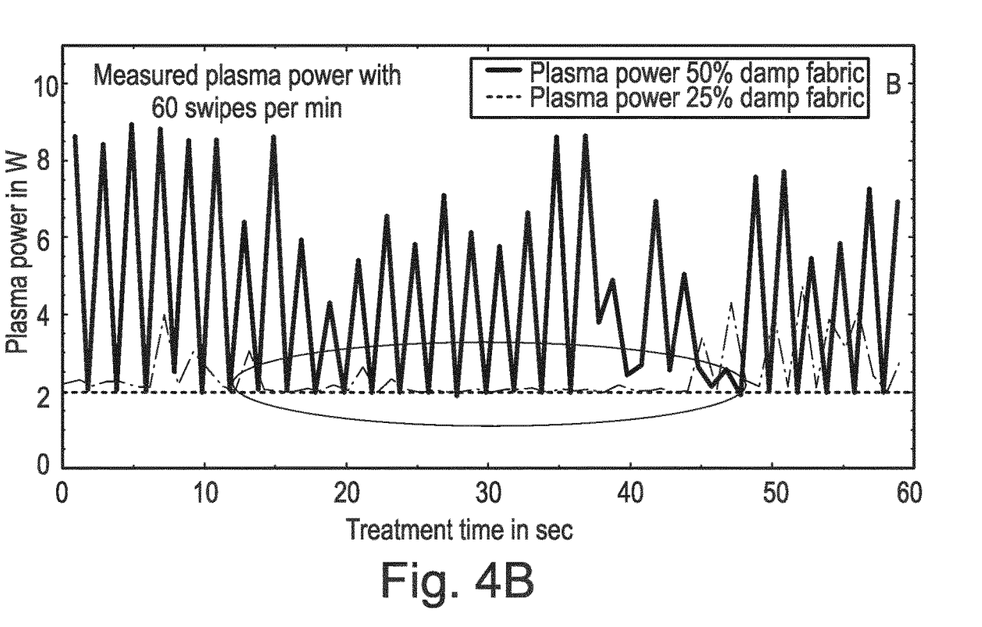

FIGS. 4A and 4B show measurements of the plasma power consumed by a plasma source of a plasma device applying cold atmospheric plasma to cotton fabrics having different damp conditions. In particular, the sample denoted as "50% damp fabric" is a cotton fabric consisting equally of a wet section and a dry section, wherein the plasma device is swiped back and forth between the wet section and the dry section. The sample denoted as "25% damp fabric" has a similar configuration with a reduced (i.e. half) amount of liquid applied to the wet section. FIG. 4A shows swiping at 30 swipes per minute while FIG. 4B shows swiping at 60 swipes per minute. The results indicate significant differences in plasma power depending on the moisture level of the fabric, as discussed in more detail below.

One can clearly identify the transfer from the dry section of the fabric to the 50% or 25% wet section of the fabric. For the dry section of the fabric a plasma power consumption of approximately 2 Watt is detected for all investigated samples within this study. This value increases to 3 to 9 Watt, as the plasma source is moved to the damp section of the fabric (50% and 25%). Based on these results it is presumed that the damages to the wet fabric shown in FIG. 3B result from an increased local temperature of the plasma source operating with an increased power. Without wanting to be bound by theory, it is presumed that the wet surface increases resistance to ignition of the plasma. It is assumed that the plasma thus ignites only locally at dry/drier spots and/or dry/drier pores of the surface to be treated, where the resulting power concentration is then high and may thus lead to small local burns. By monitoring the power consumption of the plasma source the risk of such burns may be reduced.

The results furthermore show that the measured power consumptions for the 25% damp fabric section are smaller than the power consumptions for the 50% damp section. Nevertheless, all measured power consumptions for 50% and 25% damp fabric are significantly higher than the power measured for the dry section of the fabric.

Meanwhile, in contrast to FIG. 4A which shows large differences in the power consumption for dry and wet fabrics, FIG. 4B shows that for the 25% damp fabric and with high swiping speed (60 swipes per minute), it was difficult to record this difference. This means that it is crucial to record the plasma power consumption fast enough to identify the damp section with the plasma power measurement method. An example for too slow recording is marked with an ellipse for the 25% damp fabric in FIG. 4B. It is thus considered that the power consumption of the plasma source should be recorded at a frequency of at least $10 \text{ s}^{-1}$, preferably $50 \text{ s}^{-1}$, and more preferably $100 \text{ s}^{-1}$.

In view of the results shown in FIGS. 4A and 4B, since the power consumed by the plasma source is affected by the humidity level of the fabric being treated, it is contemplated that a plasma device further capable of measuring the power consumption of the plasma source (for example by including additionally a plasma power consumption measurement system which may be realized by any known electrical circuitry—a "power monitor") can act as a moisture sensor itself. With the plasma power consumption measurement system, the plasma device may also perform an automatic cut-off when the power exceeds a certain threshold. When the power exceeds a certain threshold and/or when a pattern in the power measurements is identified that indicates that the surface to be treated exceeds a certain degree of moisture, the device may be automatically switched off and/or the power delivered to the plasma source may be automatically limited. Measurements like these can be used to define the parameters needed to control cold atmospheric plasma devices to refresh clothes, to define operating conditions, to identify dry and damp portions of clothes and adjust the plasma power accordingly, to provide different plasma settings for different fabrics, and to control the plasma power depending on the speed with which the clothes refresher is moved across the fabric. In short, in principle an almost autonomous control system can be established to ensure a safe operation of the cold atmospheric plasma refresher device under a certain range of operating conditions. This helps to provide safe treatment for various fabrics under various conditions.

Figure 5:
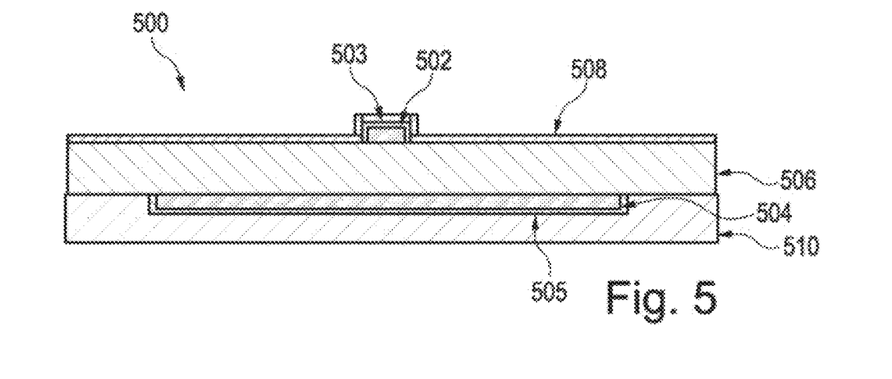
FIG. 5 is a schematic cross-sectional view showing the structure of a plasma source of a plasma device according to a preferred embodiment of the present invention.

Turning now to FIG. 5, an exemplary structure of a plasma source of a plasma device according to a preferred embodiment of the present invention will be discussed.

The plasma source 500 includes a first electrode 502, a second electrode 504 and a dielectric layer 506 separating the first electrode 502 and the second electrode 504. The first electrode 502 is configured to ignite the cold atmospheric plasma for treating the surface to be treated. That is, the first electrode 502 is arranged to be closer to the surface to be treated than the second electrode. In FIG. 5, the first electrode 502 is further covered by a dielectric material 508, which preferably is made of a plasma resistant isolation material, for example a woven glass reinforced hydrocarbon ceramic.

Viewed in the stacking direction, the second electrode 504 has preferably a thickness of at least 10 µm, wherein the first electrode 502, also viewed in the stacking direction, has preferably a thickness of at least 10 to at most 50 µm. Viewed in the stacking direction, the dielectric layer 506 has preferably a thickness of at least 100 µm to at most 300 µm. The dielectric material 508 preferably has a thickness of at least 0.1 µm viewed in the stacking direction. The dielectric material 508 preferably has a thickness of at most 30 µm viewed in the stacking direction, more preferably at most 10 µm. As such, the thickness may range from 0.1 µm to 30 µm or from 0.1 µm to 10 µm when viewed in the stacking direction.

Preferably, the first electrode 502 and/or the second electrode 504 respectively include a coating 503 and a coating 505 comprising any of the following materials: Electroless Nickel Immersion Gold (ENIG), Electroless Nickel Electroless Palladium Immersion Gold (ENEPIG), Electroless Nickel Immersion Palladium Immersion Gold (ENIPIG), Electroless Palladium (EP), and Electroless Palladium Immersion Gold (EPIG), hard gold. The coating 503 and/or the coating 505 may have a thickness of at least 0.5 µm, preferably at least 0.8 µm. The coating 503 and/or the coating 505 may have a thickness of 1.5 µm or less, preferably 1.25 µm or less. As such, the coating 503 and/or the coating 505 may have a thickness of 0.5 µm to 1.5 µm, preferably 0.8 µm to 1.25 µm, in particular when made from hard gold or any other of the previously mentioned materials.

The foregoing stacked structure is preferably constructed on a base element 510 on which also the dielectric layer 506 may be disposed and/or in which the second electrode 504 may be accommodated.

As discussed above, a plasma device according to the present invention may include segmented plasma sources, in which the basic structure as shown in FIG. 5 may still be maintained.

Figure 6A:
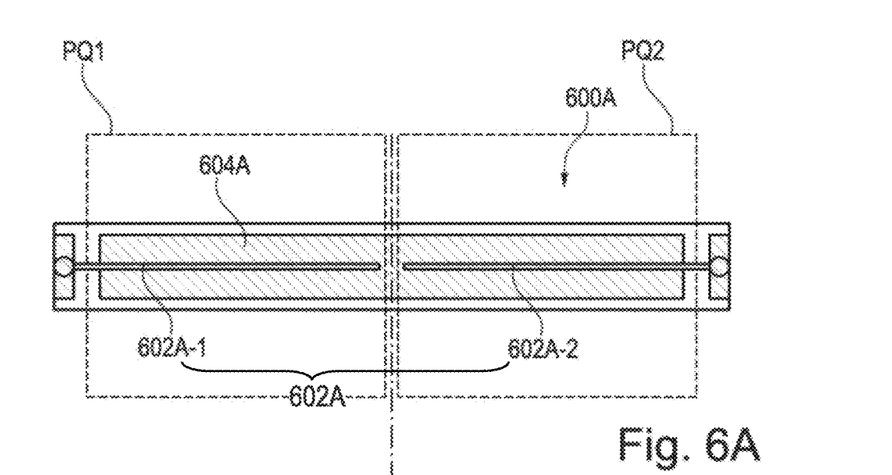
FIGS. 6A and 6B show, respectively, schematic top views of two examples of a plasma source having two plasma source segments.

Referring to FIG. 6A, the plasma source 600A includes a first plasma source segment PQ1 and a second plasma source segment PQ2. The plasma device 600A is configured to selectively switch the first plasma source segment PQ1 on only if a distance between the first plasma source segment and the surface to be treated is within the predetermined distance and to selectively switch the second plasma source segment PQ2 on only if a distance between the second plasma source segment and the surface to be treated is within the predetermined distance. The selective switching-on of each of the plasma source segments PQ1, PQ2 may be realized by means such as a distance sensor and/or a light sensor as discussed above. Furthermore, each of the plasma source segments PQ1, PQ2 may be independently equipped with the aforementioned safety measures such as the speed sensor, the surface property detection device, etc.

Similar to the structure of the plasma source 500 shown in FIG. 5, the plasma source 600A also includes a first electrode 602A, a second electrode 604A and a dielectric layer separating the first electrode 602A and the second electrode 604A, which however is not shown for better illustrating the arrangement of the electrodes. The plasma source segments PQ1, PQ2 are formed as the first electrode 602A includes a first electrode segment 602A-1 in the region of the first plasma source segment PQ1 and a second electrode segment 602A-2 in the region of the second plasma source segment PQ1. The second electrode 604A, meanwhile, may be a common electrode associated with the first and second electrode segments 602A-1, 602A-2.

Figure 7A:
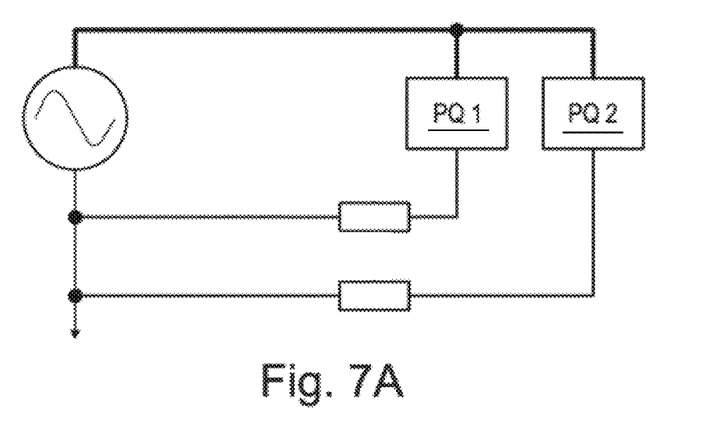
FIGS. 7A and 7B show exemplary circuit diagrams of the plasma sources shown in FIGS. 6A and 6B, respectively.

As can be seen from FIG. 7A which shows a corresponding circuitry diagram of the plasma source 600A, the plasma source segments PQ1 and PQ2 are electrically connected in parallel and can be independently activated or deactivated.

Figure 6B:
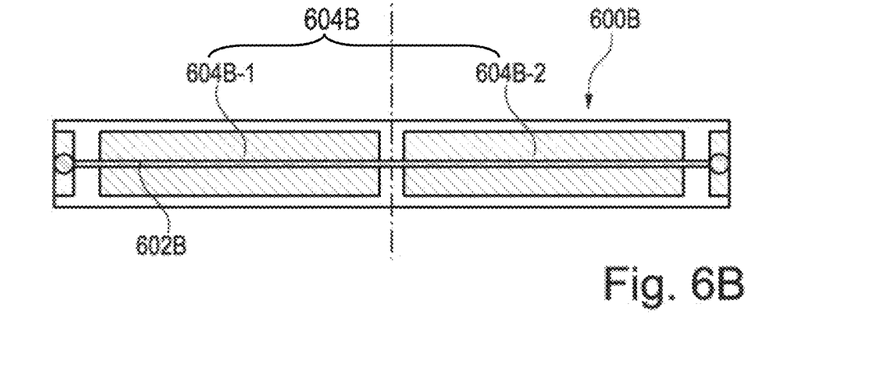
Figure 7B:
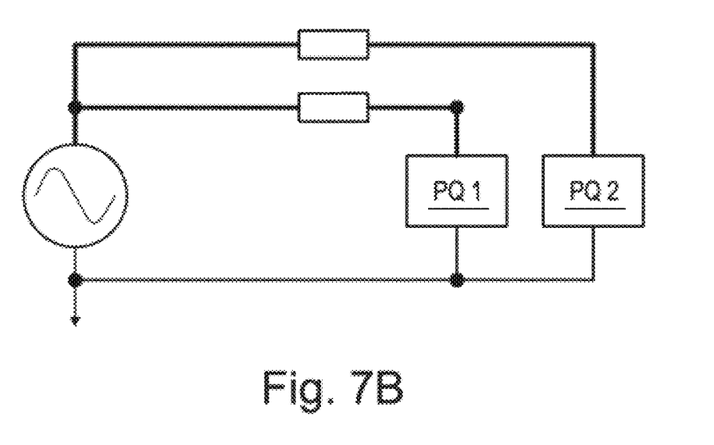

FIG. 6B and FIG. 7B, respectively, show a schematic diagram of a plasma source 600B and the corresponding circuitry diagram thereof. Similar to the plasma source 600A in FIG. 6A, the plasma source 600B includes a first electrode 602B, a second electrode 604B and a dielectric layer (not shown) separating the first electrode 602B and the second electrode 604B. In FIG. 6B, the second electrode 604B includes a first electrode segment 604B-1 and a second electrode segment 604B-2. Accordingly, the plasma source 600B is also composed of plasma source segments PQ1 and PQ2 which are electrically connected in parallel and capable of being independently activated and deactivated, as shown in FIG. 7B. As discussed above, a plasma device having a segmented plasma source is believed to be particularly suitable for treating larger areas.

Figure 8:
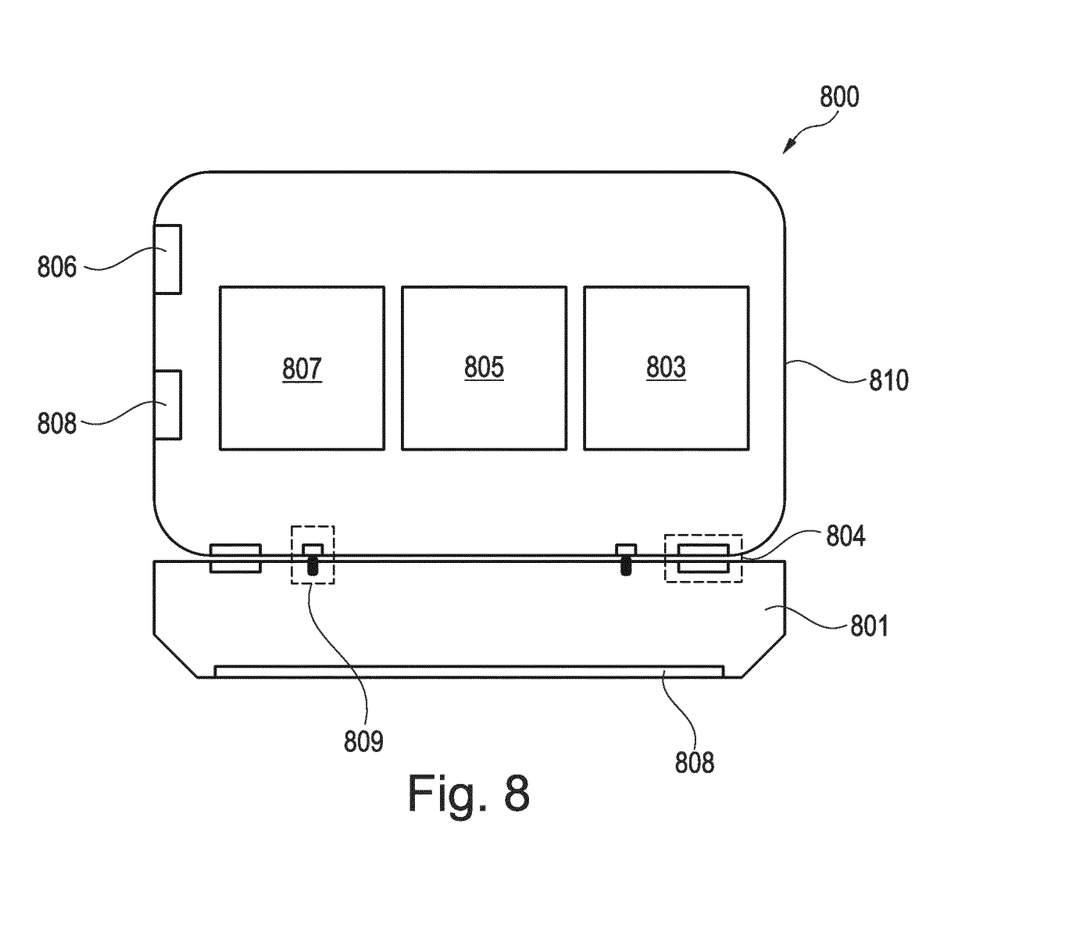
FIG. 8 shows a schematic diagram of a plasma device according to a preferred embodiment of the present invention, which includes a replaceable plasma source unit.

FIG. 8 shows a schematic diagram of a plasma device including a replaceable plasma source unit. Referring to FIG. 8, the plasma device 800 includes a plasma source unit 801 removably coupled to a main housing 810. The plasma source unit 801 includes, inter alia, the plasma source. The main housing 810 includes a battery module 803 which serves as the voltage source. The main housing 810 further includes charging electronics 807 for charging the battery module 803 and a control module 805 responsible for coordinating the respective functionalities of the plasma device 800. The main housing 810 is further provided with a main switch 806 and a power supply interface 808.

The coupling between the plasma source unit 801 and the main housing 810 may be realized by, for example, mechanical coupling means 804 and an electrical connection 809 which structurally and electrically link the plasma source unit 801 and the main housing 810. The coupling means 804 may be a pair of magnets. Of course, other coupling methods such a mechanical coupling means (e.g. snap-fit or screws) are also applicable. The electric connection 809 may be embodied, for example, in a socket-and-plug form as shown in FIG. 8 or any other suitable structure. In this way, the plasma source unit 801 can be replaced by another plasma source unit which may, for example, have a different shape/electrode structure at the side facing the material to be treated. The application window for the plasma device 800 is thus broadened.

The main housing 810 preferably is configured such that no electrical power is generated at the contacts of the electrical connection 809 provided at the main housing 810 when the plasma source unit 801 is disconnected and/or not correctly coupled via the mechanical coupling means 804. For this purpose, the main housing 810 and the plasma source unit 801 may be configured such that the electrical circuit providing voltage to the contacts of the main housing 810 is not closed when the plasma source unit 801 is disconnected. Alternatively or additionally, a sensor may be provided to the main housing 810 to check whether an adequate coupling is provided. For example, a mechanical sensor may be provided such that the sensor is pressed only when the plasma source unit 801 is adequately coupled to the main housing 810. The sensor may be electrically connected to the control module 805.

Illustrative aspects of the present invention are listed as follows:

1. A plasma device for applying a cold atmospheric plasma to a surface to be treated, in particular on textiles, leather and/or plastic fibers, the plasma device comprising:
   a housing,
   a plasma source in the housing, and
   a voltage source in the housing for applying a voltage to the plasma source, wherein the plasma device is configured to enable activation of the plasma source and/or to selectively switch the plasma source on only if a distance between the plasma source and the surface to be treated is within a predetermined distance.
2. The plasma device of item 1, wherein the predetermined distance is in a range of 0 to 4 mm, and preferably 0 to 1 mm.
3. The plasma device of item 1 or 2, wherein the plasma device comprises a distance sensor for measuring the distance between the plasma source and the surface to be treated, preferably a mechanical distance sensor.
4. The plasma device of item 1, 2 or 3, wherein the plasma device comprises:
   a voltage source connector electrically connected to the voltage source and a plasma source connector electrically connected to the plasma source, the voltage source connector and the plasma source connector being spaced apart from and movable with respect to each other, wherein
   the plasma device is configured that the voltage source connector and the plasma source connector move toward and electrically couple with each other when the housing and/or the plasma source and the surface to be treated are pressed against each other.
5. The plasma device of any of item 1 to 4, wherein the plasma device comprises a light sensor and is configured to enable activation of the plasma source only when and/or to selectively switch the plasma source on when an amount of light received by the light sensor is below a predetermined value.
6. The plasma device of any of the preceding items, wherein the plasma device is configured to switch the plasma source off automatically after the plasma source has been switched on for a predetermined period of time, preferably wherein the device comprises a timer.
7. The plasma device of any of items 1 to 5, wherein the plasma device is configured to switch the plasma source off automatically after the plasma source has been switched on for a predetermined period of time, and to enable activation of the plasma source again after the plasma source has been switched off for a predetermined waiting period.
8. The plasma device of any of the preceding items, further comprising a display or control light configured to instruct a user to ventilate a surrounding area of the plasma device after the plasma source has been switched on for a predetermined period of time.
9. The plasma device of any of the preceding items, further comprising a speed sensor for measuring a speed with which the plasma device is moved over the surface to be treated, wherein the plasma device preferably is configured to switch the plasma source off automatically when the speed detected is below a first predetermined value or above a second predetermined value.
10. The plasma device of item 9, further comprising a display or control light configured to:
provide an indication on whether the speed falls within a predetermined range; and/or
provide an indication on whether the speed is below the first predetermined value; and/or
provide an indication on whether the speed is above the second predetermined value.
11. The plasma device of any of the preceding items, further comprising a surface property detection device for detecting at least one property of the surface to be treated.
12. The plasma device of item 11,
wherein the surface property detection device comprises a moisture sensor for detecting a moisture level of the surface to be treated, wherein the plasma device is configured to switch the plasma source off automatically if the moisture level of the surface to be treated is higher than a predetermined moisture value; and/or
wherein a moisture level of the surface to be treated is detected by a power monitor, measuring a power consumed by the plasma source, preferably wherein the power consumed by the plasma source is recorded at a frequency of at least $10\ s^{-1}$, preferably $50\ s^{-1}$, and more preferably $100\ s^{-1}$.
13. The plasma device of item 11 or 12, wherein the surface property detection device comprises a temperature sensor for detecting a temperature of the surface to be treated, wherein the plasma device is configured to switch the plasma source off automatically if the temperature of the surface to be treated is higher than a predetermined temperature value.
14. The plasma device of item 11, 12 or 13, wherein the device comprises control circuitry configured to adjust the plasma depending on the detected surface property, in particular depending on the detected moisture level and/or temperature.
15. The plasma device of any of the preceding items, wherein the plasma source comprises a first electrode, a second electrode and a dielectric layer separating the first electrode and the second electrode, wherein the first electrode is configured to ignite the cold atmospheric plasma for treating the surface to be treated.
16. The plasma device of item 15, wherein the first electrode is arranged to be closer to the surface to be treated than the second electrode, preferably wherein the first electrode is configured to contact the surface to be treated.
17. The plasma device of item 15 or 16, wherein the first electrode or a dielectric material covering the first electrode is exposed to surrounding atmosphere through an opening of the housing while the second electrode is arranged inside the housing.
18. The plasma device of item 15, wherein
the first electrode is grounded;
the plasma device further comprises an on/off switch electrically connected to the first electrode; and
the plasma device is configured to selectively switch the plasma source on only if the on/off switch is pressed by a user.
19. The plasma device of any of items 15 to 18, further comprising a temperature sensor configured to detect a temperature of the first electrode, wherein the plasma device is configured to selectively switch the plasma source off automatically when the temperature of the first electrode is higher than a predetermined value.
20. The plasma device of any of items 1 to 19, wherein the plasma source comprises at least one first plasma source segment and at least one second plasma source segment, wherein the plasma device is configured to selectively switch the first plasma source segment on only if a distance between the first plasma source segment and the surface to be treated is within the predetermined distance and to selectively switch the second plasma source segment on only if a distance between the second plasma source segment and the surface to be treated is within the predetermined distance.
21. The plasma device of item 20, wherein one of the first electrode and the second electrode comprises a first electrode segment in a region of the first plasma source segment and a second electrode segment in a region of the second plasma source segment.
22. The plasma device of item 21, wherein the other one of the first electrode and the second electrode is a common electrode associated with the first and second electrode segments.
23. The plasma device of item 22, wherein the common electrode is formed by the first electrode.
24. The plasma device of item 22 or 23, wherein the plasma device comprises a dielectric layer separating the first electrode segment and the second electrode segment from each other and/or from the common electrode.
25. The plasma device of any of items 21 to 24, wherein the first plasma source segment and the second plasma source segment are electrically connected in parallel.
26. The plasma device of any of the preceding items, wherein
the plasma source is accommodated in a plasma source unit of the plasma device;
the voltage source is accommodated in a main housing of the plasma device; and
the plasma source unit is removably coupled to the main housing.

27. The plasma device of any of the preceding items, wherein the plasma device is a portable or handheld device.

28. A plasma device for applying a cold atmospheric plasma to a surface to be treated, the plasma device comprising:
a plasma source,
a voltage source for applying a voltage to the plasma source, and
a speed sensor configured to measure a speed with which the plasma device is moved over the surface to be treated, wherein the plasma device is configured to:
selectively switch the plasma source off when the speed detected is below a first predetermined value; and/or
selectively switch the plasma source off when the speed detected is above a second predetermined value;
provide an indication to the user, in particular via a display or control light, when the speed detected is below the first predetermined value; and/or
provide an indication to the user, in particular via a display or control light, when the speed detected is above the second predetermined value.

29. A plasma device for applying a cold atmospheric plasma to a surface to be treated, the plasma device comprising:
a plasma source,
a voltage source for applying a voltage to the plasma source, and
control circuitry,
wherein the plasma source provides a first plasma source segment and a second plasma source segment that are independently activated by the control circuitry,
wherein the plasma source comprises a first electrode, a second electrode and a dielectric layer separating the first electrode and the second electrode, wherein the first electrode is configured to ignite the cold atmospheric plasma for treating the surface to be treated,
wherein one of the first electrode and the second electrode comprises a first electrode segment in a region of the first plasma source segment and a second electrode segment in a region of the second plasma source segment, and
wherein the other one of the first electrode and the second electrode is a common electrode associated with the first and second electrode segments.

30. The plasma device of item 29, wherein the plasma device comprises a dielectric layer separating the first electrode segment and the second electrode segment from each other and/or from the common electrode.

31. Use of the plasma device of item 1, 28 or 29 as a moisture sensor, wherein the plasma device is configured to contain a power monitor, which can measure a power consumed by the plasma source.

32. The use of item 32, wherein the power consumed by the plasma source is recorded at a frequency of at least $10\ s^{-1}$, preferably $50\ s^{-1}$, and more preferably $100\ s^{-1}$.

The invention claimed is:

1. A plasma device for applying a cold atmospheric plasma to a surface to be treated, in particular on textiles, leather or plastic fibers, the plasma device comprising:
a housing,
a plasma source in the housing,
a voltage source in the housing for applying a voltage to the plasma source, wherein the plasma device is configured to enable activation of the plasma source or to selectively switch the plasma source on only if a distance between the plasma source and the surface to be treated is within a predetermined distance, and
a voltage source connector electrically connected to the voltage source and a plasma source connector electrically connected to the plasma source, the voltage source connector and the plasma source connector being spaced apart from and movable with respect to each other,
wherein the plasma device is configured such that the voltage source connector and the plasma source connector move toward and electrically couple with each other when one of the housing and the plasma source are pressed against the surface to be treated.

2. The plasma device of claim 1, wherein the predetermined distance is in a range of 0 to 4 mm.

3. The plasma device of claim 1, wherein the plasma device comprises a distance sensor for measuring the distance between the plasma source and the surface to be treated.

4. The plasma device of claim 3, wherein the distance sensor is a mechanical distance sensor.

5. The plasma device of claim 1, wherein the plasma device comprises a light sensor and is configured to enable activation of the plasma source only when, or to selectively switch the plasma source on when, an amount of light received by the light sensor is below a predetermined value.

6. The plasma device of claim 1, wherein the plasma device is configured to switch the plasma source off automatically after the plasma source has been switched on for a predetermined period of time.

7. The plasma device of claim 1, further comprising:
a display or control light configured to instruct a user to ventilate a surrounding area of the plasma device after the plasma source has been switched on for a predetermined period of time.

8. The plasma device of claim 1, further comprising a surface property detection device for detecting at least one property of the surface to be treated, wherein the surface property detection device comprises a temperature sensor for detecting a temperature of the surface to be treated, wherein the plasma device is configured to switch the plasma source off automatically if the temperature of the surface to be treated is higher than a predetermined temperature value.

9. The plasma device of claim 1, wherein the plasma source comprises a first electrode, a second electrode and a dielectric layer separating the first electrode and the second electrode, wherein the first electrode is configured to ignite the cold atmospheric plasma for treating the surface to be treated, wherein the first electrode is arranged to be closer to the surface to be treated than the second electrode.

10. The plasma device of claim 9, wherein the first electrode is configured to contact the surface to be treated.

11. The plasma device of claim 9, further comprising:
a temperature sensor configured to detect a temperature of the first electrode, wherein the plasma device is configured to selectively switch the plasma source off automatically when the temperature of the first electrode is higher than a predetermined value.

12. The plasma device of claim 1, wherein the plasma source comprises at least one first plasma source segment and at least one second plasma source segment, wherein the plasma device is configured to selectively switch the first plasma source segment on only if a distance between the first plasma source segment and the surface to be treated is within the predetermined distance and to selectively switch the second plasma source segment on only if a distance between the second plasma source segment and the surface to be treated is within the predetermined distance.

13. The plasma device of claim 1, wherein
the plasma source is accommodated in a plasma source unit of the plasma device,
the voltage source is accommodated in a main housing of the plasma device, and
the plasma source unit is removably coupled to the main housing.

14. The plasma device of claim 1, wherein the plasma device is a portable or handheld device.

15. A method of using the plasma device of claim 1 to apply a cold atmospheric plasma to a surface to be treated, the method comprising:
positioning the plasma source within a threshold distance from the surface to be treated;
applying a voltage to a plasma source from a voltage source while the plasma source is positioned within the threshold distance from the surface to be treated;
igniting the cold atmospheric plasma with an electrode of the plasma source while the voltage is applied to the plasma source;
applying the cold atmospheric plasma to the surface to be treated upon or after ignition of the cold atmospheric plasma;
positioning the plasma source beyond the threshold distance from the surface to be treated; and
electrically disconnecting the plasma source from the voltage source while the plasma source is positioned beyond the threshold distance from the surface to be treated.

16. A plasma device for applying a cold atmospheric plasma to a surface to be treated, in particular on textiles, leather or plastic fibers, the plasma device comprising:
a housing,
a plasma source in the housing,
a voltage source in the housing for applying a voltage to the plasma source, wherein the plasma device is configured to enable activation of the plasma source or to selectively switch the plasma source on only if a distance between the plasma source and the surface to be treated is within a predetermined distance, and
a speed sensor to measure a speed with which the plasma device is moved over the surface to be treated, wherein the plasma device is configured to switch the plasma source off automatically when the speed detected is below a first predetermined value or above a second predetermined value.

17. The plasma device of claim 16, wherein the plasma device further comprises a display or control light configured to provide an indication selected from the group consisting of an indication on whether the speed falls within a predetermined range, an indication on whether the speed is below the first predetermined value, provide an indication on whether the speed is above the second predetermined value, and combinations thereof.

18. The plasma device of claim 16, wherein the plasma source comprises a first electrode, a second electrode and a dielectric layer separating the first electrode and the second electrode, wherein the first electrode is configured to ignite the cold atmospheric plasma for treating the surface to be treated, wherein the first electrode is arranged to be closer to the surface to be treated than the second electrode, wherein the first electrode is configured to contact the surface to be treated, the plasma device further comprising a temperature sensor configured to detect a temperature of the first electrode, wherein the plasma device is configured to selectively switch the plasma source off automatically when the temperature of the first electrode is higher than a predetermined value.

19. A plasma device for applying a cold atmospheric plasma to a surface to be treated, in particular on textiles, leather or plastic fibers, the plasma device comprising:
a housing,
a plasma source in the housing,
a voltage source in the housing for applying a voltage to the plasma source, wherein the plasma device is configured to enable activation of the plasma source or to selectively switch the plasma source on only if a distance between the plasma source and the surface to be treated is within a predetermined distance, and
a moisture sensor for detecting a moisture level of the surface to be treated, wherein the plasma device is configured to switch the plasma source off automatically if the moisture level of the surface to be treated is higher than a predetermined moisture value.

20. The plasma device of claim 19, wherein the moisture level of the surface to be treated is detected by measuring a power consumed by the plasma source.

21. The plasma device of claim 20, wherein the power consumed by the plasma source is recorded at a frequency of at least $10\ \text{s}^{-1}$.

22. The plasma device of claim 19, wherein the plasma source comprises a first electrode, a second electrode and a dielectric layer separating the first electrode and the second electrode, wherein the first electrode is configured to ignite the cold atmospheric plasma for treating the surface to be treated, wherein the first electrode is arranged to be closer to the surface to be treated than the second electrode, wherein the first electrode is configured to contact the surface to be treated, the plasma device further comprising a temperature sensor configured to detect a temperature of the first electrode, wherein the plasma device is configured to selectively switch the plasma source off automatically when the temperature of the first electrode is higher than a predetermined value.

* * * * *